United States Patent
Yasui et al.

(10) Patent No.: US 7,236,206 B2
(45) Date of Patent: Jun. 26, 2007

(54) INTERPOLATION METHOD FOR A VIDEO SIGNAL, AND DISPLAY DEVICE WITH FUNCTION OF INTERPOLATION FOR A VIDEO SIGNAL

(76) Inventors: Masaru Yasui, 4-20-3, Karibadai, Nishi-ku, Kobe, Hyogo (JP); Satoshi Hirano, 3-32-10-906, 3-chome, Akatsuka-Shinmachi, Itabashi-ku, Tokyo (JP); Takeo Kamiya, deceased, late of Kobe (JP); by Akira Kamiya, legal representative, 15-4, Toei-cho 3-chome, Anjo-shi, Aichi (JP)

( * ) Notice: Subject to any disclaimer, the term of this patent is extended or adjusted under 35 U.S.C. 154(b) by 960 days.

(21) Appl. No.: 09/890,214

(22) PCT Filed: Nov. 29, 2000

(86) PCT No.: PCT/EP00/11920

§ 371 (c)(1),
(2), (4) Date: May 31, 2002

(87) PCT Pub. No.: WO01/41429

PCT Pub. Date: Jun. 7, 2001

(65) Prior Publication Data

US 2002/0180746 A1 Dec. 5, 2002

(30) Foreign Application Priority Data

Nov. 30, 1999 (JP) ................. 99-333365

(51) Int. Cl.
*H04N 7/01* (2006.01)

(52) U.S. Cl. .................................. 348/458

(58) Field of Classification Search ............... 348/581, 348/446, 448, 458, 459, 555, 556
See application file for complete search history.

(56) References Cited

U.S. PATENT DOCUMENTS

| 5,168,362 | A | * | 12/1992 | Yoshida ................... 348/696 |
| 5,928,313 | A | * | 7/1999 | Thompson ................ 708/313 |
| 5,963,261 | A | * | 10/1999 | Dean ....................... 348/446 |
| 5,978,052 | A | * | 11/1999 | Ilcisin et al. .............. 348/797 |
| 6,072,457 | A | * | 6/2000 | Hashimoto et al. ......... 345/100 |

(Continued)

*Primary Examiner*—Paulos Natnael
(74) *Attorney, Agent, or Firm*—Birch, Stewart, Kolasch & Birch, LLP

(57) ABSTRACT

A video signal interpolation can adapt an image of input video signal to voluntary aspect ratios widely. The invention also allows a display device to uniformly line-sequential scan and uses at least two line-memories (LM1, LM2) which are applied with an input digital video signal and controls writing and reading for these line-memories to generate a video signal subjected to vertical interpolation from a reading output of the line-memories. In the control, any one of the line-memories are circularly selected, and a sample sequence of the input digital video signal is sequentially written into the selected line-memory at its sample rate while sequentially reading out samples of the written sequence at a constant rate which is higher than the sample rate and which is according to a desired ratio of interpolation (vertical expansion ratio), wherein, when one of the line-memories is in writing operation, the other one of the line-memories is repeatedly read out. The invention also relates to a horizontal interpolation method for a video signal.

11 Claims, 9 Drawing Sheets

U.S. PATENT DOCUMENTS

| | | | |
|---|---|---|---|
| 6,348,950 B1 * | 2/2002 | Kishida | 348/458 |
| 6,404,458 B1 * | 6/2002 | Kang | 348/445 |
| 6,667,773 B1 * | 12/2003 | Han, II | 348/441 |
| 6,714,717 B1 * | 3/2004 | Lowe et al. | 386/13 |
| 6,806,914 B1 * | 10/2004 | Onagawa | 348/581 |
| 6,831,700 B2 * | 12/2004 | Hoshikawa | 348/446 |

* cited by examiner

INTERPOLATION METHOD FOR A VIDEO SIGNAL, AND DISPLAY DEVICE WITH FUNCTION OF INTERPOLATION FOR A VIDEO SIGNAL

BACKGROUND OF THE INVENTION

1. Field of the Invention

The present invention relates to an interpolation method for a video signal, and a display device performing interpolation for a video signal. The present invention further relates to a liquid crystal display device capable of making a display image in accordance with a digital video signal.

2. Description of the Prior Art

A circuit adjusting the size of an image to be displayed, to fit to the actual dimension of a display screen by performing interpolation for an input video signal is disclosed in Japanese Patent Laid-Open Application No. 79905/98 (U.S. Pat. No. 5,818,416). The circuit described in this reference aims at easily enlarging or contracting the size of an image to be displayed on a digital display device.

To this end, the known circuit is arranged to enable the value of an external control signal to be altered and to perform frequency multiplication for a horizontal synchronizing signal in accordance with the value so as to obtain a sampling clock signal to be fed into an analog-digital converter, whereby the clock frequency is variable. The enlargement and contraction of an image in a horizontal direction is achieved by altering the data quantity of the involved digital image signal per a scanning line, which is to be written into a memory during one cycle of the horizontal synchronizing signal, by means of utilizing the sampling clock signal as a write-enable signal for the memory.

The enlargement and contraction of an image in a vertical direction is achieved in such a manner that a clock signal having a higher frequency than the sampling clock signal (the write-enable signal) is used as a read-enable signal to read the written digital image signal from the memory at a number of times during one horizontal scanning period of the input video signal so as to display them on a plurality of scanning lines.

However, the known circuit has a number of disadvantages as follows. With this circuit, when interpolation is performed horizontally, the sampling frequency for the analog-digital converter which receives an analog video signal is increased (decreased when contraction is required), and thus the number of samples of an output digital video signal or the number of dot data pieces to be used for display is increased (decreased when contraction is required). Thus, if a video signal is provided as a digital signal to the display device, this circuit is simply helpless. If the horizontal interpolation technique underlying this circuit were forcibly applied to an input digital video signal, the input digital video signal would have to be converted by a digital-analog converter into an analog signal once, and subsequently the resultant analog signal would be digitized again at a desired frequency for the horizontal interpolation. This would require complicated process and circuit configuration.

With the circuit, when interpolation is achieved vertically, control is introduced such that either a clock signal with a higher frequency or a clock signal with a normal frequency is selected as a read-enable signal for each horizontal scanning period of the input video signal, and the number of horizontal scanning periods of the input video signal during which the higher frequency clock is selected is adjusted in accordance with the specified size of the image in a vertical direction. Such a manner of interpolation does not allow a sufficient freedom in selection of the interpolation ratio. Namely, the interpolation ratios selectable are rather limited. Moreover, because the video information to be carried by an interpolated line must be applied for the corresponding line of a display device in a considerably shorter period than that required for the information carried by the other (ordinary) line, higher speed scanning is needed for only the interpolated line. Accordingly, it may cause the sequential scanning operation of the display device side to have a partiality.

SUMMARY OF THE INVENTION

In view of the above-mentioned circumstances, the present invention principally aims at providing a method and a display device for achieving a wide-range interpolation process whereby it is possible to adapt an image carried by an input video signal to any given size without a complicated configuration.

Another object of this invention is to provide an interpolation method for a video signal and a display device with a function of interpolating for a video signal, whereby it is possible to achieve uniform sequential scanning on a display device.

To this end, according to one aspect of the invention we provide an interpolation method for a video signal, in which at least two line-memories are used, the line-memories being applied with an input digital video signal, and in which the line-memories are subjected to controls on their writing and reading so that a video signal subjected to vertical interpolation is generated from reading outputs of the line-memories, wherein for the controls on writing and reading, any of the line-memories are circularly selected and a sample sequence of the input digital video signal is sequentially written into the selected line-memory at a sample rate of the sample sequence, and at the same time the samples of the written sequence are sequentially read out at a substantially constant rate which is in accordance with a desired vertical expansion ratio and which is higher than the sample rate, wherein, when one of the line-memories is in a writing operation, the other one of the line-memories is subjected to a repeatedly reading control.

The line-memories may be FIFO type memories having a dual port.

The constant rate may correspond to a dot-frequency of image to be displayed.

A line-memory to be in a reading mode may be designated based on a synchronization signal having a frequency more than by a factor of the vertical expansion ratio as high as a horizontal synchronization frequency of the input digital video signal.

According to another aspect of the invention we provide an interpolation method for a video signal, in which at least one line-memory is used, the line-memory being applied with an input digital video signal, and in which the line-memory is subjected to controlling including writing and reading thereof so that a video signal subjected to horizontal interpolation is generated from a reading-output of the line-memory, wherein the signal subjected to horizontal interpolation is applied to a serial input of a shift-register for applying pixel information signals associated respectively with column electrodes each extending in a vertical direction of a display area in displaying means, a shift-clock signal is applied to the shift-register, the shift-clock signal having a predetermined frequency for shifting data latched in the shift-register, for the controlling: a sequence of samples of the input digital video signal is written into the line-memory while the samples of the written sequence are sequentially read out in response to a read-clock signal; and a frequency of the read-clock signal is set to have a constant frequency which is lower than the frequency of the shift-clock signal and which is in accordance with a desired horizontal expansion ratio.

The read-clock signal may be generated based on the shift-clock signal.

Within one horizontal scanning period, one line of samples stored in the line-memory may be read out at uniform intervals.

According to a further aspect of the invention we provide a display device with a function of interpolating for a video signal, in which at least two line-memories are used, the line-memories being applied with an input digital video signal, and in which the line-memories are subjected to controls on their writing and reading so that a video signal subjected to a vertical interpolation is generated from reading-outputs of the line-memories, wherein the device comprises: control means for performing such a control that in the controls on writing and reading, any of the line-memories are circularly selected and a sequence of samples of the input digital video signal are sequentially written into the selected line-memory at a sample rate of the samples, and at the same time the samples of the written sequence are sequentially read out at a substantially constant rate which is in accordance with a desired vertical expansion ratio and which is higher than the sample rate, wherein, when one of the line-memories is in a writing operation, the other one of the line-memories is subjected to a repeatedly reading control.

According to a yet further aspect of the invention we provide a display device with a function of interpolating for a video signal, comprising at least one line-memory being applied with an input digital video signal, wherein the line-memory is subjected to controlling including writing and reading thereof so that a video signal subjected to horizontal interpolation is generated from reading-outputs of the line-memories, which further comprises: means for applying the signal subjected to horizontal interpolation to a serial input of a shift-register for applying pixel information signals associated respectively with column electrodes each extending in a vertical direction of a display area in displaying means; means for applying a shift-clock signal to the shift-register, the shift-clock signal having a predetermined frequency for shifting data latched in the shift-register; and means for performing writing a sequence of samples of the input digital video signal into the line-memory while sequentially reading out the samples of the written sequence in response to a read-clock signal, a frequency of the read-clock signal being set to have a constant frequency which is lower than the frequency of the shift-clock signal and which is in accordance with a desired horizontal expansion ratio.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the an from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT(S)

1. Vertical Interpolation

Figure 1:
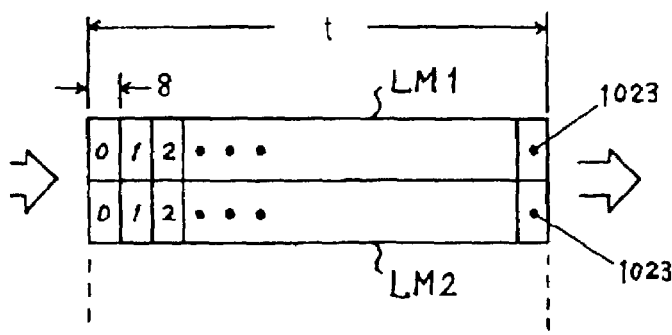
FIG. 1 is a schematic diagram showing a configuration of line-memories used for an interpolation method according to the invention and a relation between their input and output.
Figure 2A:
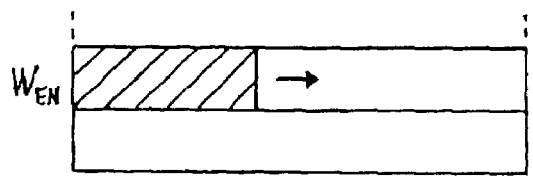
FIG. 2 is a schematic diagram showing the states of the line-memories for explaining a principle of the vertical interpolation method according to the invention.
Figure 2B:
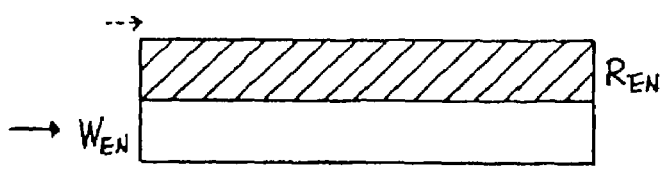
Figure 2C:
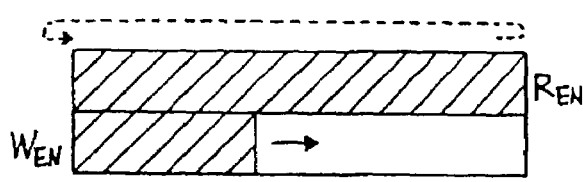
Figure 2D:
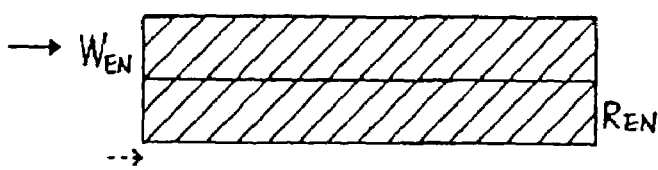
Figure 2E:
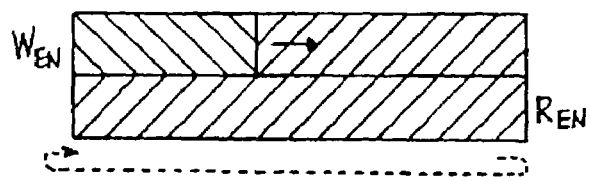

FIG. 1 schematically shows two line-memories which are used for execution of a video signal interpolation method according to an embodiment of the invention, and relationship between inputs and outputs of the memories.

According to the embodiment shown in FIG. 1, two line-memories LM1 and LM2 are used as a memory section for interpolation process. Each of these memories can store, for example, an NTSC or PAL digital video signal, or a VGA, SVGA or XGA digital video signal fed from a certain source (not illustrated here) sample by sample for one line (i.e., dots or pixel information delivered during one horizontal synchronization period). For example, a sample is expressed by 8 bits, and video data carried by one line consist of 1024 samples. The line-memories LM1 and LM2 may incorporate the so-called FIFO (First In First Out) memory, and the line-memories of this embodiment incorporate an FIFO memory with a dual port.

The memory allows sequential writing of $S_0$, $S_1$, ..., $S_{1023}$ carried by a line of an input digital video signal, and allows sequential reading of the written samples $S_0$, $S_1, \ldots, S_{1023}$ in this order. The samples read from one line-memory forms a cluster of digital pixel information signals for one line to be fed to a display device such as an LCD (Liquid Crystal Display) panel. These clusters of digital pixel information signals each for a line are read out from the memories in a form of a train continued along a time axis as a video signal having undergone vertical interpolation. Vertical interpolation is performed on an input digital video signal by use of the line-memories LM1 and LM2 and their control as described below.

It is noted that a sampling clock signal (or sample-synchronized signal) of the input digital video signal is used as a write-clock signal for these line-memories LM1, LM2. In addition, a clock signal (dot clock signal) having a constant frequency determined by a horizontal scanning frequency at which the display device should undergo scanning is used as a read-clock signal. Therefore, for example, if an original image represented by an input digital video signal has a size smaller than an image on the full screen of the display device and it is required to enlarge the original image to fit to the larger image on the screen, or if the number of horizontal scanning lines per field (or frame) is larger for the output digital video signal than for the input digital video signal, the data transfer rate will be higher for the output than for the input. In other words, the rate of reading data from the memory is set higher than the rate of writing data into the memory.

FIG. 2 diagrammatically illustrates the principle of the vertical interpolation for a digital video signal.

At (A) representing the initial stage, the line-memory LM1 enters into a write mode while its reading operation is inhibited. On the other hand, reading operation of the line-memory LM2 is also inhibited. Thus, only a write-enable signal $W_{EN}$ for the line-memory LM1 is valid, so that the samples of an input digital video signal is sequentially written in response to the write-clock signal.

At the next stage (B), the line-memory LM1 becomes full of the written samples and stops the writing operation. Continuously, a write-enable signal $W_{EN}$ for the line-memory LM2 becomes active so that the line-memory 2 enters into a write mode, and at the same time a read-enable signal $R_{EN}$ for the line-memory LM1 becomes active so that the reading operation of the memory LM1 becomes possible.

At the following stage (C), because the line-memory LM2 is inhibited from reading and the reading rate is higher than the writing rate as mentioned earlier, data samples stored in the line-memory LM1 are repeatedly read out any number of times until the line-memory LM2 finishes the writing operation. This performs actual interpolation work for generating new line information to be inserted between lines.

After that, as shown in the stage (D), the line-memory LM2 is full of the written samples and finishes the writing operation, in response to which the line-memory LM1 re-enters into a write mode. Then, after the completion of reading of the last sample stored in the line-memory LM1, a read-enable signal $R_{EN}$ for the line-memory LM2 becomes active to turn the line-memory LM2 into a read mode. It is noted that at this situation the line-memory LM1 may temporarily permit both writing and reading operations in parallel. Such parallel operations are possible by using a dual-port memory for the line-memory. Because the reading rate is higher than the writing rate, the address for writing can never overtake the address for reading, so that the switching of a read mode from the line-memory LM1 to the line-memory LM2 is smoothly carried out with no problem soon after the line-memory LM1 enters into a write mode.

Then, the stage (E) is reached, where the line-memories LM1, LM2 work for writing and reading modes, respectively. These modes are opposed to what is observed in the stage (C) with respect to the line-memories: the line-memory LM1 is inhibited from being read out while data stored in line-memory LM2 are repeatedly read out. Also at this stage, interpolation (insertion) operation is practiced as is performed in the stage (C). Then, operations in the states as seen in the stages (B) to (E) are repeated.

Figure 3:
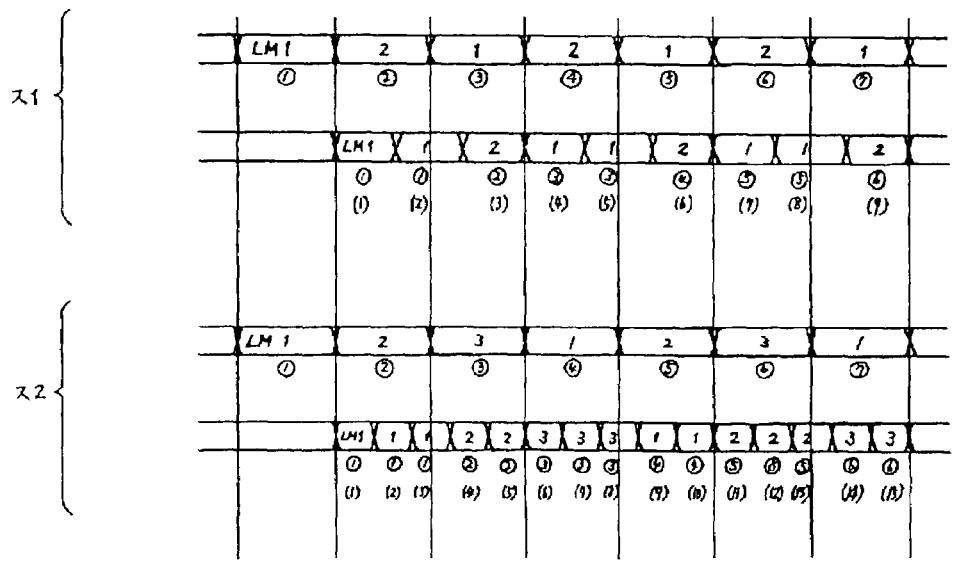
FIG. 3 is a time-chart showing how to execute vertical interpolation under various conditions in an embodiment according to the invention.

FIG. 3 shows in a time-chart the relation between the line-memory in a write mode and the other line-memory in a read mode under various conditions where the interpolation operation as described above is executed.

Case 1 is a case where two line-memories LM1 and LM2 are used and working on an expansion ratio of 3/2. Expansion ratio is a ratio of the number of lines per frame (or field) of an output video signal to an input video signal. In FIG. 3, reference numerals 1, 2, . . . represent the numbers of line-memories designated in each mode. Reference numerals (1), (2), . . . mean the line numbers of an input digital video signal. Reference numerals [1], [2], . . . mean the numbers of scanning lines (row electrodes) activated (or addressed) in the LCD panel.

In case 1, data of each of the line numbers (1), (3), (5), etc. are read two times, and utilized as line data corresponding to different (but adjacent) active scanning lines of the LCD panel. Further, during a period for which two lines are counted in the input video signal, three lines are counted in the output video signal. Hence it is seen that line data are interpolated at the expansion ratio of 3/2. Furthermore, the active periods of scanning lines are all uniform, and thus there is no partiality in scanning operation in contrast to the prior art.

Case 2 is a case where the line-memory LM3 is used in addition to the two line-memories LM1 and LM2 with an expansion ratio of 5/2.

In case 2, data of each of the line numbers (1), (3), (5), etc. are read three times, and utilized as line data corresponding to three adjacent active scanning lines (1)–(3), (6)–(8), and (11)–(13) of the LCD panel. Data of each of the line numbers (2), (4) and (6) are read two times, and utilized as line data corresponding to two adjacent active scanning lines (4) and (5), (9) and (10), and (14) and (15) of the LCD panel. Further, during a period for which two lines are counted in the input video signal, five lines are counted in the output video signal. Therefore it is seen that line data are interpolated at the expansion ratio of 5/2. Also in this case, the disadvantage mentioned above is overcome.

According to the vertical interpolation method of the invention, it is possible to select any vertical expansion ratio, and to make sequential scanning uniform on a time axis. Moreover, since the invention requires only two line-memories to achieve such advantage, it is possible to contribute to a reduced size of necessary circuitry and to provide inexpensive products.

2. Horizontal Interpolation

Figure 4:
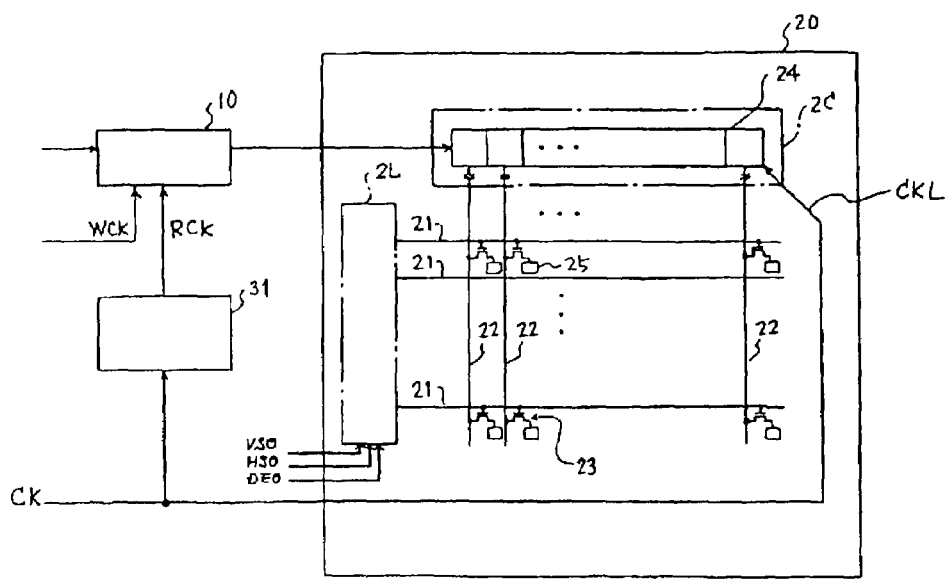
FIG. 4 is a block diagram showing a configuration for implementing the horizontal interpolation method according to an embodiment of the invention.

FIG. 4 schematically shows a configuration for implementing a horizontal interpolation method for a video signal according to an embodiment of the invention.

Referring to FIG. 4, an input digital video signal as described above is applied to a line-memory section 10 comprising at least one line-memory, together with its sample clock signal. The line-memory section 10 utilizes the sample clock signal as a write clock signal WCK thereof, and sequentially stores a series of samples of the input digital video signal in response to the sample clock signal. The line-memory 10 may include at least two line-memories so as to enable not only horizontal interpolation but also the above-mentioned vertical interpolation.

The line-memory section 10 permits a reading operation in parallel with a writing operation. The line-memory section 10 permits sequential reading of a series of the stored samples in response to the read clock signal RCK. The series of samples thus read are fed as a video signal undergoing horizontal interpolation to an LCD panel 20.

The LCD panel 20 of this embodiment is of an active matrix type. The panel comprises row and column electrodes 21, 22 crossing to each other at a right angle, thin film transistors (TFTs) 33 whose gates are connected to the row electrodes 21 and whose sources are connected to the column electrodes 22, a column section 2C including column registers 24 to apply pixel information signals to the column electrodes 22 for each scanning period, a row control section 2L for applying a line driving signal to sequentially select and activate the row electrodes 21 for each horizontal scanning period, pixel electrodes 25 connected to the drains of the TFTs, and a liquid crystal layer (not shown) intervening between the pixel electrodes and a common electrode (not shown) opposite to the pixel electrodes.

The row control section 2L determines a timing to select a row electrode 21, depending on a timing signal such as a vertical synchronization signal VSO, horizontal synchronization signal HSO and data active signal DEO as described later.

The above-mentioned video signal undergoing horizontal interpolation is applied to a serial input of the column register 24 of the LCD panel 20 which serves as display means. The column register 24 is a shift register comprising unit registers connected in series with each other, the number of the unit registers being the same as that of the column electrodes 22, the unit registers being capable of parallel outputs individually. The column register 24 shifts its stored data by one unit register's step in response to the activation timing (for example, at the rising edge of the clock signal) of a shift clock signal CKL, and captures data of the serial input signal to put them into the first unit register. Although FIG. 4 does not show any composite blocks other than the column register 24 in the column control section 2C, the column control section 24 further includes digital/analog (D/A) converters to convert parallel outputs from the row register 24 into respective analog signals, to provide them to the column electrodes 22.

A shift clock signal CKL is generated outside the panel 20. It is also called a dot clock, for which a clock signal CK serving as a pixel synchronization signal associated with the input video signal is used. The pixel sync signal adapts to the screen size of the LCD panel. This clock signal CK may be used as the so-called reference clock signal generated by e.g. a quartz oscillator.

The clock signal CK is also used as a base or origin signal from which the above-mentioned read clock signal RCK is derived. The clock signal CK is applied to a decimation circuit 31 which is a member of the control means. In the decimation circuit 31, the clock signal CK is converted into a signal of which the number of pulses or the number of active time points (for example, the rising edges of pulses) per one horizontal scanning period is reduced. The resultant signal serves as a read clock signal RCK. Such a reduction of pulses is preferably achieved according to a predetermined manner as described later.

Figure 5:
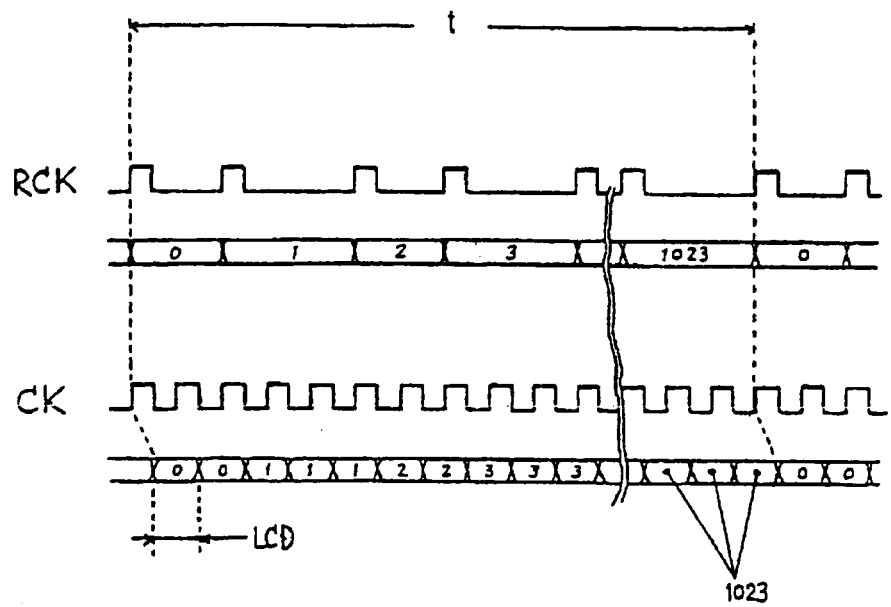
FIG. 5 is a time-chart showing the operation of the embodiment as shown in FIG. 4.

The operation of this configuration will be described with reference to FIG. 5. The clock signal CK causes the data latched in the column register 24 to be shifted in units of dot or pixel corresponding to the column electrodes 22 of the LCD panel 20, while the samples of data stored in the line-memory section 10 are sequentially read out based on timing of the read clock signal RCK whose pulses have been decimated. The line-memory section 10 increments the current address number by one in response to a pulse of the read clock signal RCK, outputs the sample of data designated by the resultant address number, and holds it until the next pulse is applied thereto. Accordingly, as shown in FIG. 5, the sample data 0, 1, 2, 3, . . . read out from the line memory section 10 are repeatedly captured into the unit registers of the column register 24 a number of times according to an interval between pulses of the read clock signal RCK as a series of data samples in the order of 0, 0, 1, 1, 1, 2, 2, 3, . . . , etc. This means that a data sample is interpolated a number of times corresponding to the number of pulses that are decimated in the clock signal CK.

The number of pulses deleted from the clock signal CK to generate the read clock signal RCK depends on a ratio between the number of samples stored in the line-memory section 10 (or the number of samples per line of the input digital video signal) and the number of column electrodes 22 disposed in the LCD panel 20 (or the number of pixels to be displayed on one line). A preferred way to generate the read clock signal RCK will be described later.

Now a liquid crystal display (LCD) device to which the interpolation method for a video signal according to the invention has been applied will be described.

Figure 6:
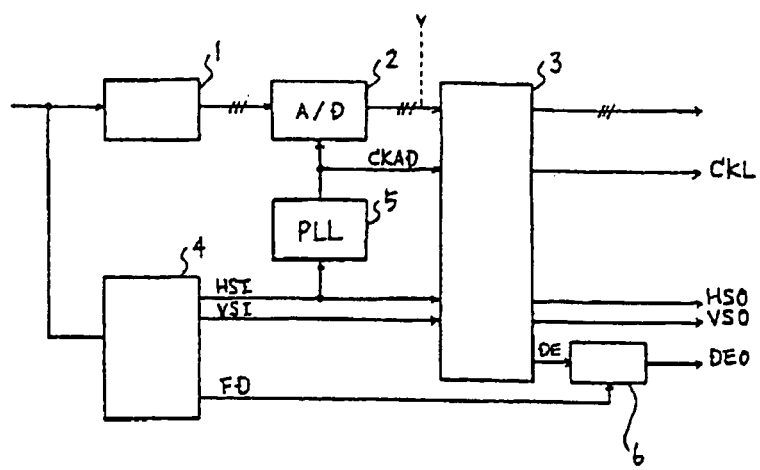
FIG. 6 is a block diagram showing a general composition of a video signal processing circuit of an LCD device to which the invention has been applied.

FIG. 6 shows general configuration of a video signal processing section for the LCD device.

In FIG. 6, an input analog signal, e.g., composite video signal based on an NTSC or PAL system is applied to a video decoder 1. The video decoder 1 decomposes the applied video signal into three primary components to generate the corresponding analog RGB video signals. The RGB signals are digitized in an analog/digital (A/D) converter 2 respectively, and the resultant RGB video signals are applied to a scan converter 3.

The input composite analog video signal is also applied to a sync separation circuit 4. The sync separation circuit 4 separates/extracts a horizontal sync signal HSI and a vertical sync signal VSI from the applied video signal to apply them to the scan converter 3. The circuit 4 also determines whether the video signal presents an odd-numbered field or an even-numbered field, and outputs a field determination signal FD indicating the determination result.

The horizontal sync signal HSI is also provided to a PLL circuit 5. The PLL circuit 5 generates based on the horizontal sync signal HSI a sampling clock signal CKAD which is then used by the A/D converter 2. To put it more specifically, the PLL circuit 5 generates a sampling clock signal CKAD by making phase-locking to the horizontal sync signal HIS and multiplying its frequency. The sampling clock signal CKAD is also provided to the scan converter 3.

The multiplication ratio d imposed by the PLL circuit 5 can be expressed as follows. Firstly, a frequency of the sampling clock signal CKAD or a sampling rate $F_s$ at which sampling is made in the A/D converter 2 can be expressed as follows.

$F_s$=(the number of the column electrodes of the LCD panel)/(Effective horizontal scanning period of the input video signal)

To obtain the sampling clock signal CKAD, the PLL circuit 5 makes the multiplication from the frequency $F_{HSI}$ of the horizontal sync signal HSI to $F_s$ while keeping the synchronization with the horizontal sync signal HSI. Thus, $$d = F_S/F_{HSI}$$

The scan converter 3 performs vertical and/or horizontal interpolation as described above for the RGB video signals, respectively. The resultant RGB video signals undergoing the interpolation are applied to the column control section 2C of the LCD panel 20 as shown in FIG. 4.

The scan converter 3 also generates different types of signals that are necessary for handling the interpolated signal. One of the different types is an output horizontal sync signal HSO which is adapted to the interpolated signal, which is generated based on the horizontal sync signal HSI. Another type is an output vertical sync signal VSO which is generated based on the vertical sync signal VSI and which is adapted to the interpolated signal. The scan converter 3 also generates a clock signal CKL (see FIG. 4) which corresponds to or is synchronized with pixel information components of the video signal. Put another way, the clock signal CKL is a dot clock signal adapted to the interpolated video signal. The scan converter 3 further generates a data enable signal DE. The data enable signal DE indicates a period during which pixel information is presented in the interpolated video signal.

The output RGB video signals, clock signal CKL, and output horizontal and vertical sync signals HSO and VSO are provided to the LCD panel 20. The data enable signal DE is provided to a display position correction circuit 6. The display position correction circuit 6 modifies a data enable signal DE in accordance with the field determination signal FD, and provides the modified data enable signal DEO to the LCD panel in order to achieve proper scanning.

Figure 7:
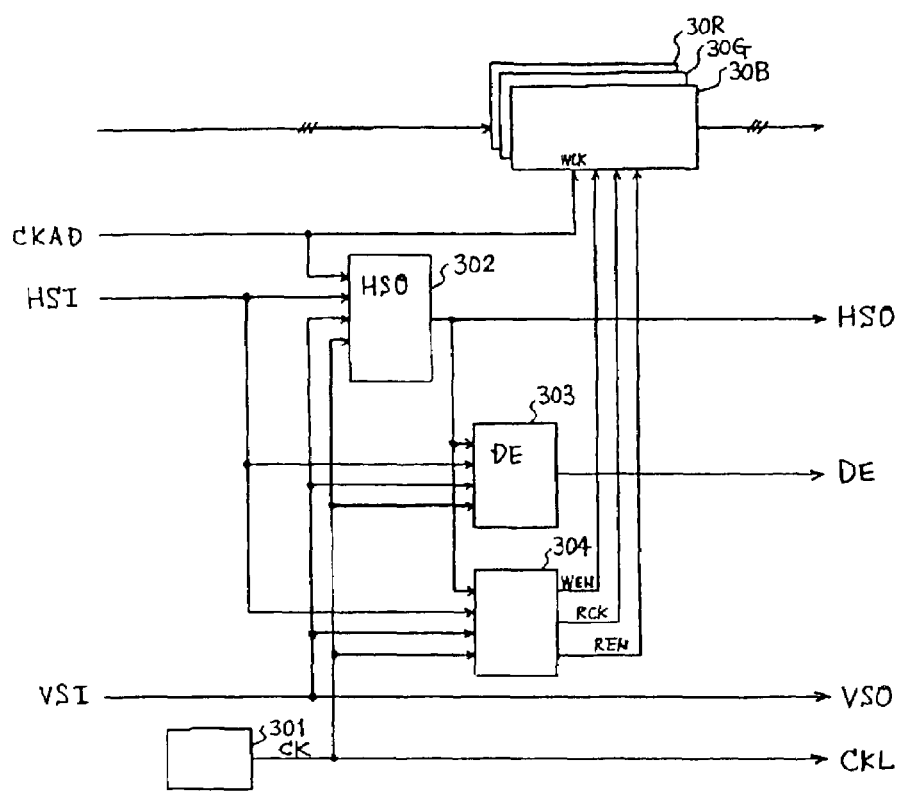
FIG. 7 is a block diagram showing a general composition of a scan converter of the circuit as depicted in FIG. 6.

FIG. 7 shows a detailed configuration of the scan converter 3.

As shown in FIG. 7, the scan converter 3 includes memory sections 30R, 30G and 30B each having at least two line-memories for interpolation (or at least one if only horizontal interpolation is executed) as described above. These memory sections are supplied with the RGB video signals in the form of digital video signals from the A/D converter 2. From the outputs of the memory section, the interpolated RGB video signals are derived.

A timing control section governing a system including the memory sections is constituted by a clock generating circuit 301, an HSO generating circuit 302, a DE generating circuit 303 and a line-memory control circuit 304.

The clock generating circuit 301 includes, for example, an automatic clock generator such as a quartz oscillator, and generates at an output a stable clock signal having a dot frequency for the LCD panel. The clock signal CK may serve as a shift clock CKL to be fed to the LCD panel 20 (display device) as described in FIG. 4. The clock signal CK is also provided to the HSO generating circuit 302, the DE generating circuit 303 and the line-memory control circuit 304.

The HSO generating circuit 302 receives, in addition to a clock signal CK, a horizontal sync signal HSI, a vertical sync signal VSI and a sampling clock signal CKAD, and generates an output horizontal sync signal HSO based on those signals. An example of a way to generate an output horizontal sync signal HSO will be described later.

The DE generating circuit 303 receives, in addition to a clock signal CK, a horizontal sync signal HSI, a vertical sync signal VSI and an output horizontal sync signal HSO, and generates a data enable signal DE based on them. The data enable signal DE indicates a period or term during which the dot data of the output video signal are valid or active.

The line-memory control circuit 304 receives, in addition to a clock signal CK, a horizontal sync signal HSI, a vertical sync signal VSI and an output horizontal sync signal HSO, and generates, based on those signals, a write enable signal WEN, a read enable signal and a read clock signal for the line-memory sections 30R, 30G and 30B. The read enable signal REN is generated in the manner as described above in relation to FIGS. 1 to 3. An example of a way to generate the read clock signal RCK will be described later.

The sampling clock signal CKAD is used for the write clock WCK for the line-memories 30R, 30G and 30B.

Next, operation of the HSO generating circuit 302 and RCK generation of the line-memory control circuit 304 will be described.

Figure 8:
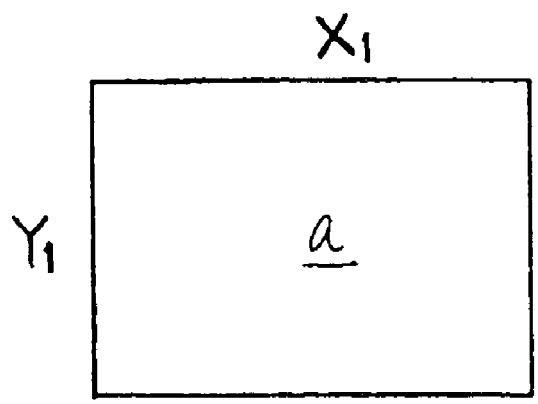
FIG. 8 is a schematic diagram showing an original image and an displayed image obtained by use of the interpolation treatment according to the method of the invention.
Figure 8:
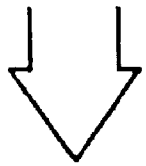
Figure 8:
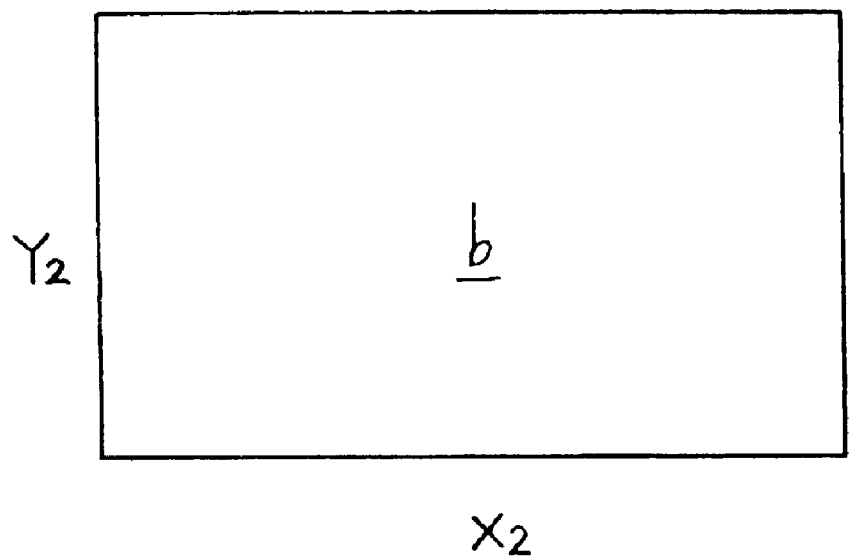

Assume that the size of an image is converted as shown in FIG. 8. The original image (a) represented by an input digital video signal is to be converted to an image (b) to be displayed in the display device in question. The number of dots (pixels) per one line representing the image size in a horizontal direction and the number of lines (horizontal scanning lines) per field (or frame) representing the image size in a vertical direction are $X_1$ and $Y_1$ for the image (a), respectively, but $X_2$ and $Y_2$ for the image (b), respectively ($X_1$ is a value of $X_2$ or larger, $Y_1$ is a value of $Y_2$ or larger). Thus, the horizontal expansion ratio is $X_2/X_1$, and the vertical expansion ratio is $Y_2/Y_1$.

The HSO generating circuit 302 generates an output horizontal sync signal HSO which has a frequency that is $Y_1/Y_1$ times a frequency of the horizontal sync signal HSI. The line-memory control circuit 304 controls such that $X_1$ pulses are generated in the read clock signal RCK in a term during which $X_2$ pulses are generated in the clock signal CK.

Figure 9:
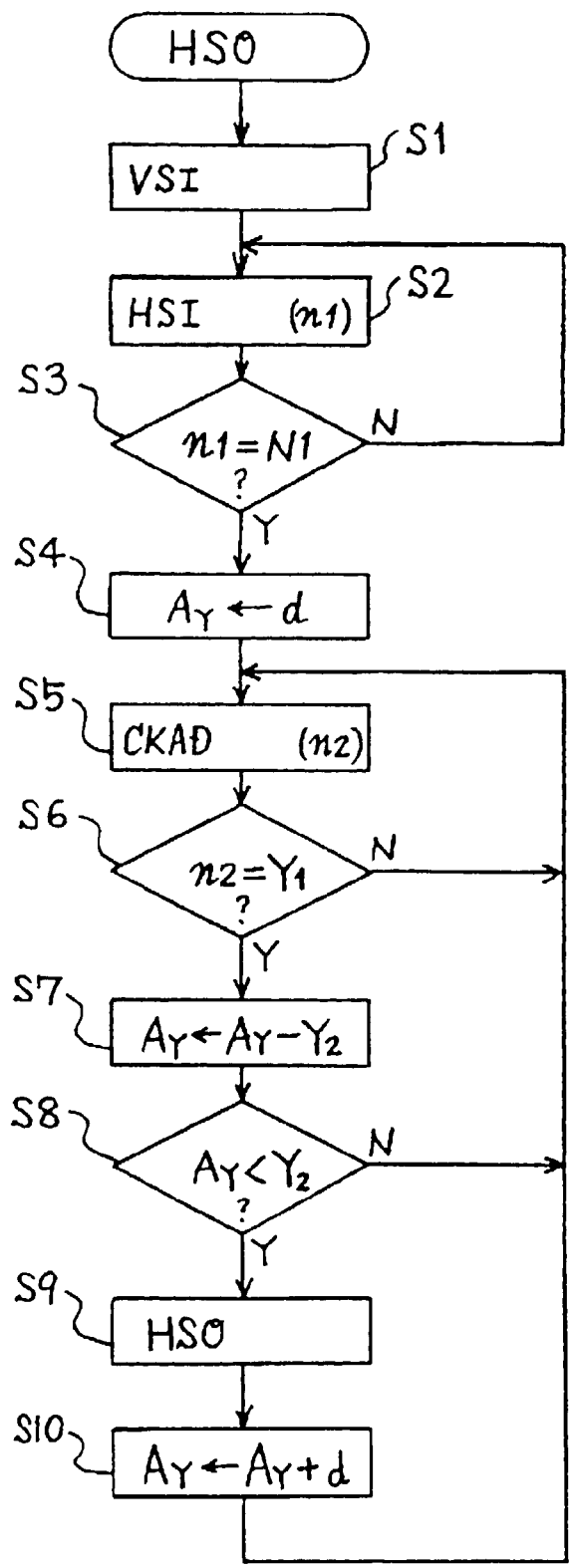
FIG. 9 is a flowchart showing the operation of HSO circuit in the scan converter as depicted in FIG. 7.
Figure 10:
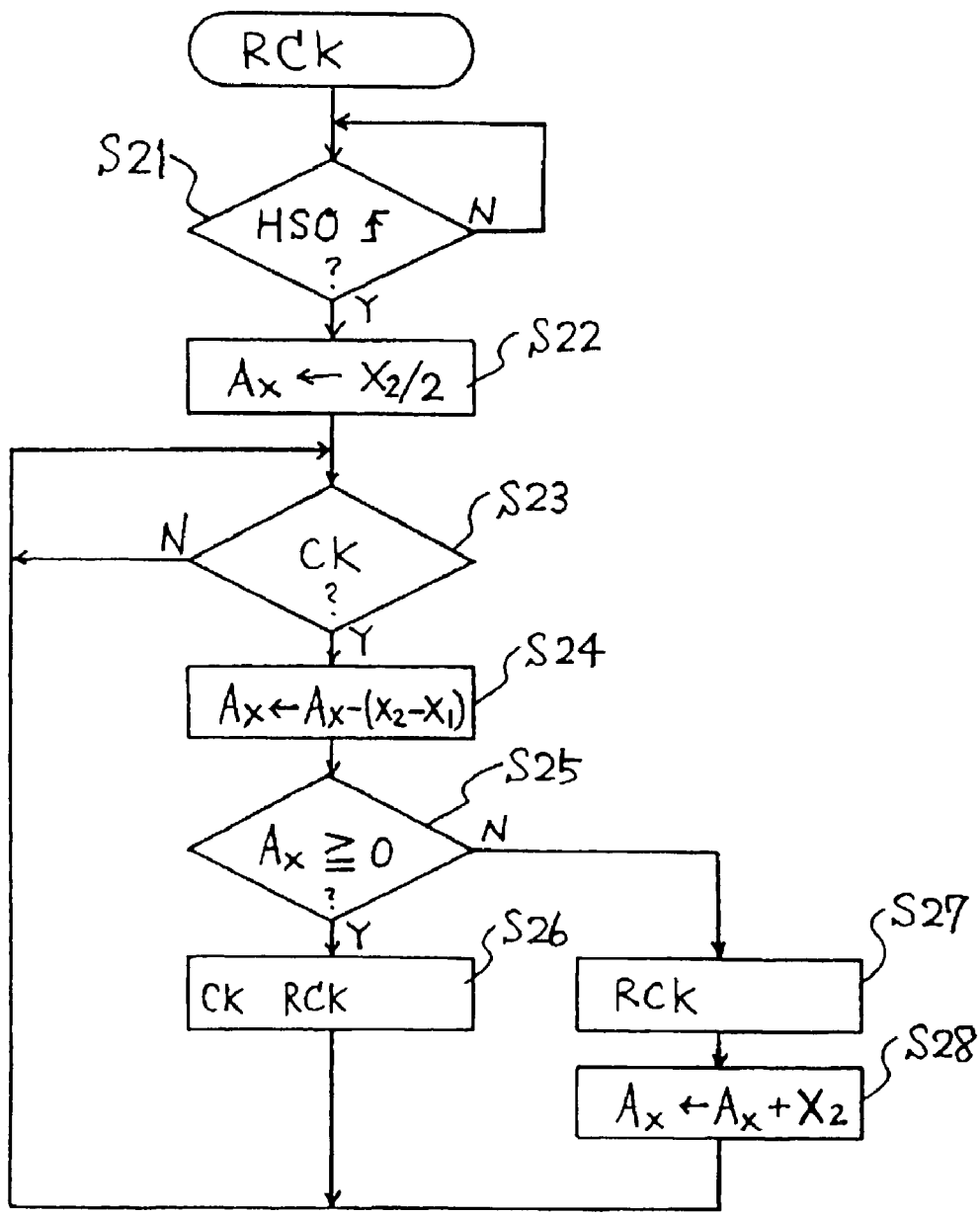
FIG. 10 is a flowchart showing how to generate a read clock signal in the line-memory control circuit in the scan converter of FIG. 7.

For $X_1$ and $X_2$, and $Y_1$ and $Y_2$ in flowcharts of FIGS. 9 and 10, instead of the original numbers of dots and lines as mentioned above, the lowest numbers obtained from the original numbers are used. The lowest numbers is obtained by reducing fractions of the original numbers to their lowest terms. For example, if a video signal based on VGA (640 rows×480 columns) is converted into a video signal based on XGA (1024 rows×768 columns), values of 5 and 8 are used as $X_1$ and $X_2$, and $Y_1$ and $Y_2$, respectively. In this case, d has a value about 800. This value is far greater than the values of $X_1$ and $X_2$, and $Y_1$ and $Y_2$ obtained after the reduction.

HSO generating circuit 302 generates an output horizontal synch signal HSO for each field (or frame), based on an algorithm as depicted in FIG. 9.

Firstly, it detects the rising edge of the vertical sync signal VSI as a start of a field (step S1). Then, a counter n1 counts the number of times the horizontal sync signal HSI has been active after the detection of the start until N1 (steps S2 and S3). N1 is, here, a properly given number for defining, based on the start point of a field, a timing point at which an actual process should begin to generate an active output horizontal sync signal.

When the counter n1 counts N1, the multiplication ratio d for the horizontal sync signal HSI is set into an accumulator $A_Y$ (step S4). Then, pulses of the sampling clock signal CKAD are counted by a counter n2 (step S5). Each time the counter n2 counts $Y_1$ representing a vertical size of the original image (a), a value of $Y_2$ representing the vertical size of the displayed image (b) is subtracted from a value stored in accumulator $A_Y$ (steps S6 and S7).

It is noted that the counters n1 and n2 are reset at an initial stage of the process.

After step S7, it is determined whether or not the value of the accumulator $A_Y$ is smaller than that of $Y_2$ (step S8). If it is equal to or larger than a value of $Y_2$, the process returns to step S5. If it is smaller than a value of $Y_2$, the process adds the value of d to the value of the accumulator $A_Y$, and proceeds to step S5.

As already described above, the HSO generating circuit 302 generates the output horizontal sync signal HSO having a frequency that is $Y_2/Y_1$ (horizontal expansion ratio) times a frequency of the horizontal sync signal HSI. Furthermore, from the above equation, it is seen that the number of pulses of the clock signal CKAD within one period of the horizontal sync signal HSI is d. Thus, if each time $d/(Y_2/Y_1)$ pulses of the clock signal CKAD are counted, an pulse of the output horizontal sync signal is generated, then the output horizontal sync signal HSO can have a frequency in accordance with the required expansion ratio.

$d/(Y_2/Y_1)$ represents the value of d divided by the value of $(Y_2/Y_1)$. This dividing operation is equal to checking how many times the value of $(Y_2/Y_1)$ can be subtracted from the value of d before the remainder is below zero. Namely, while the value of $(Y_2/Y_1)$ is repeatedly subtracted from the value of d one after another, it is determined when the subtraction can not be advanced further and such an instant corresponds to a time point at which the result of the dividing operation has been reached. Each time the clock signal CKAD is active, the subtraction of $(Y_2/Y_1)$ from the value of d is executed, and when the subtraction becomes unable, $d/(Y_2/Y_1)$ pulses of CKAD are obtained. This time point or the unable situation is such proper timing that the output horizontal sync signal should be outputted.

The subtraction operation as described above is executed at steps S5 to S8 of FIG. 9, and determination of the unable state of subtraction is executed at step S8. To put it more specifically, if the value of $(Y_2/Y_1)$ is directly subtracted from the value of d, such calculation would be complicated, because $Y_2/Y_1$ is a fraction. To avoid that, each time it counts the number of $Y_1$ with respect to the clock signal CKAD at steps S5 and S6, $Y_2$ is subtracted at step S7. By these steps, the subtraction operation is made simplified.

At step S10, the remainder left after the preceding output horizontal sync signal HSO has pulsed is used as a computation material for generating the next pulse of the output horizontal sync signal. Therefore it is possible to generate an output horizontal sync signal HSO having a constant frequency and uniform cycles within the required span of a field or frame.

Thus, it is possible to generate an output horizontal sync signal having a frequency according to a desired horizontal expansion ratio. At line-memory control circuit 304, the horizontal sync signal HSO directs the timing point at which the read-enable signal $R_{EN}$ (see FIG. 2) is generated. When an active pulse of the horizontal sync signal HSO is generated during reading operation of one line-memory, the line-memory control circuit 304 switches the provision of read-enable signal $R_{EN}$ from the one line-memory to the next line-memory so as to shift the next line-memory to a read mode as long as the next line-memory to a read mode is not in a write mode.

Timing of generation of the write-enable signal $W_{EN}$ equates timing of generation of an active pulse of the horizontal sync signal HSI. Each time an active pulse of the horizontal sync signal HSI is generated, the line-memory control circuit 304 provides a line-memory to be selected with the write-enable signal $W_{EN}$ so that the line-memories are circularly switched.

RCK generating circuit 305 generates a read clock signal RCK based on the algorithm as depicted in FIG. 10.

Firstly, it sets a value of $X_2/2$ to an accumulator Ax in response to a rising edge of the output horizontal sync signal HSO (steps S21 and S22). However, if a value of $X_2$ is an odd number, it sets a value of $(X_2+1)/2$ to it.

Then, when the clock signal CK is active, a value of $(X_2-X_1)$ is subtracted from the value of accumulator Ax (steps S23 and S24). If the resultant value of the accumulator $A_x$ is zero or more, a pulse equivalent to a pulse of the clock signal CK is outputted as a pulse of the read clock signal RCK (step S26). Here, a pulse of the clock signal CK may be used as a pulse of the read clock signal RCK.

In contrast, if the resultant value of the accumulator Ax is below zero, it does not respond to any pulses of the clock signal CK, and generates no pulse of the read clock signal RCK (step S27), and adds a value of $X_2$ to the value of the accumulator Ax (step S28). Alternatively, the relevant pulse of the clock signal CK may be gated to be masked.

After steps S26 and S28, it goes back to step S23, and repeats the same process.

$X_1$ pulses are generated in the read clock signal RCK within a period during which $X_2$ pulses are generated the clock signal CK. This means that the read clock signal RCK become active at a rate having a gradient of $X_1/X_2$ in response to activation of the clock signal CK. If $X_1$ and $X_2$ are 1 and 2, respectively, then the gradient will be ½. This will be achieved by generating one pulse of the read clock signal RCK every two pulses of the clock signal CK.

In reality, however, $X_1$ and $X_2$ often take numbers such as 5 and 8. In such a case, the gradient (⅝) is not an integer but a fraction, which requires some ideas. To meet this, it checks what value [n×(⅝)] will take in response to the n-th pulse of the clock signal CK, and generates a pulse of the read clock signal RCK depending on the check result. Specifically, the value includes ⅝ (=0.625), 10/8 (=1.25), 15/8 (=1.875), 20/8 (=2.5), . . . , and their nearest integers are 1, 1, 2, 3, . . . , etc., which are obtained e.g., by rounding off the decimals. Only if the current value of the nearest integers is the same as the preceding one, a pulse of the read clock signal RCK is not generated to use the same sample on the previous address of the line-memory again. The procedures represented by the flowchart of FIG. 10 are based on this concept. To put it specifically, the check is made based on the quotient and remainder obtained by dividing a number increasing to 5, 10, 15, . . . in this order by 8.

To divide a certain number by 8 means to subtract 8 from the number as many as possible before the remainder is below zero, to obtain the number of subtraction times and the remainder. Accordingly, subtracting 8 from the number which increases by 5 each time a clock signal CK is active is equal to subtracting (8−5) each time the clock signal CK is active. This computation is executed at step S24.

In the computing process, if the remainder is four or more, the read clock signal RCK is active, and if the remainder is below four, it is not activated. However, it is complicated in process to determine whether the remainder is below four or not each time a clock signal CK is active. To avoid this, the accumulator is set in advance to four at step S22. This enables to accomplish an easy process: it determines at step S25 whether the value of the accumulator Ax obtained at step S24 (here, a value for computing the remainder of (5n+4)/8) is positive or not. If positive, it allows the read clock signal RCK to be activated at step S26. If negative, it prohibits pulse-generation of the read clock signal RCK at step S27.

The treatment executed at step S28 concerns with a process of a carried forward account in which the remainder obtained by the preceding computation routine is transferred to the next routine.

Thus, it is possible to generate a read clock signal RCK having a frequency according to any required expansion ratio.

Next, the display position correction circuit 6 will be detailed. This circuit is suitably used for an input video signal for an interlace system.

Figure 11A:
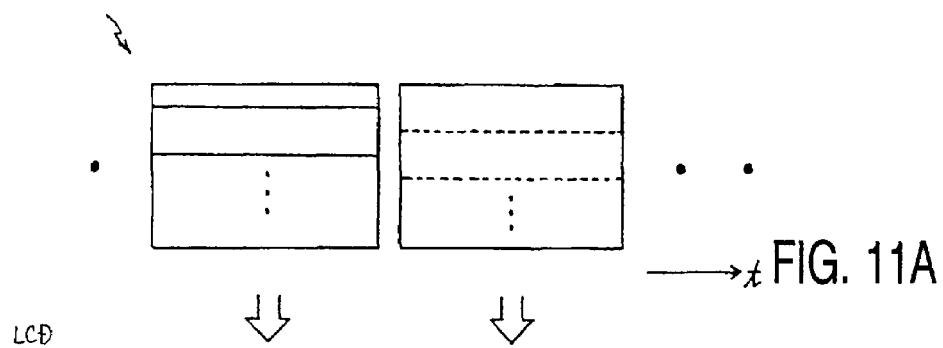
FIG. 11 is a schematic diagram for explaining why the display position correction circuit as shown in FIG. 6 is required.

Video signal for interlace scanning is represented by images as depicted in FIG. 11(A). Namely, to create an image, odd-numbered field and even-numbered field appear alternately, and their scanning lines are shifted by one line from each other.

Figure 11B:
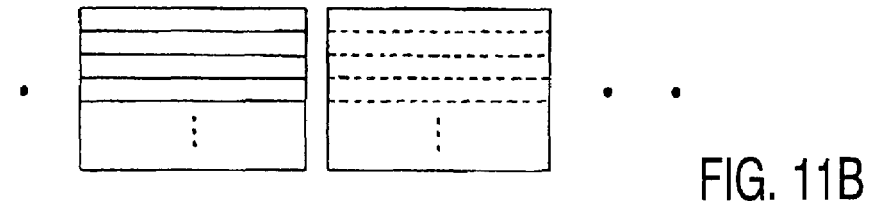

If the video signal for interlace scanning are subjected to vertical interpolation at a vertical expansion ratio of e.g., 2 by the circuitry except the display position correction circuit 6 in the configuration of FIG. 6 of the embodiment, the resultant video signal makes formation as depicted in FIG. 11(B). Namely, even though the scanning lines are duplicated for both the odd-numbered and even-numbered fields, line positions and a display-start positions in both fields come into the same under the interpolation process.

Figure 11C:
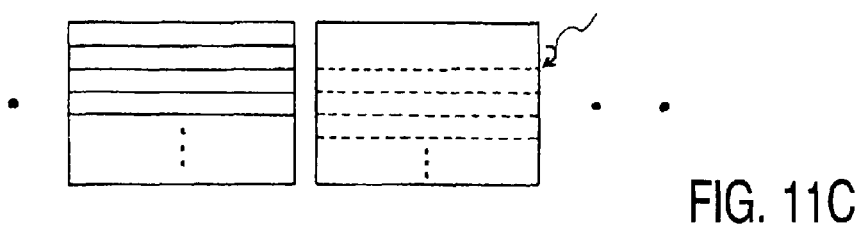

The even-numbered scanning line must be shifted downward by one line from the odd-numbered scanning line. Therefore, the even-numbered field's lines are required to be shifted downward by one line as shown in FIG. 11(C), or the odd-numbered field's lines are required to be shifted upward by one line, or some work of scanning line shifting equivalent thereto is required.

Generally, the amount of the scanning line shifting is given by the following equation.

RND [vertical expansion ratio/2]

Here, RND [X] represents a function of converting X into an integer. In this operation, if X has a value less than 1, the value will be omitted.

Figure 12:
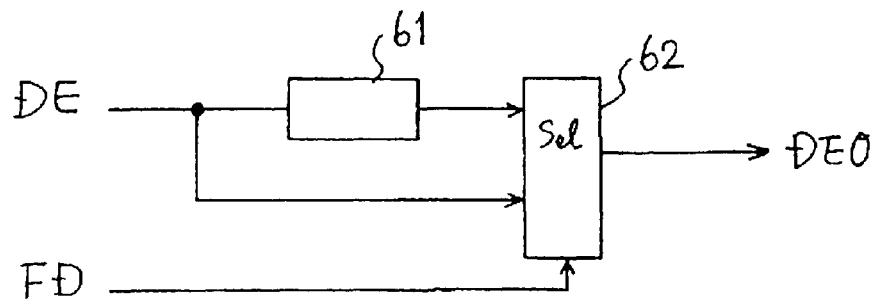
FIG. 12 is a block diagram showing in detail the composition of the display position correction circuit of FIG. 6.

The display position correction circuit 6 is a circuit for achieving such scanning line shifting. As shown in FIG. 12, the circuit 6 includes a shift circuit 61 receiving a data enable signal DE and supplying a shift output and non-shift output, and a selection circuit 62 receiving, the shift output and non-shift output as signal inputs, and a field determination signal FD as a control input. From an output of the selection circuit 62, the data enable signal DEO to be applied to the LCD panel is obtained.

Figure 13:
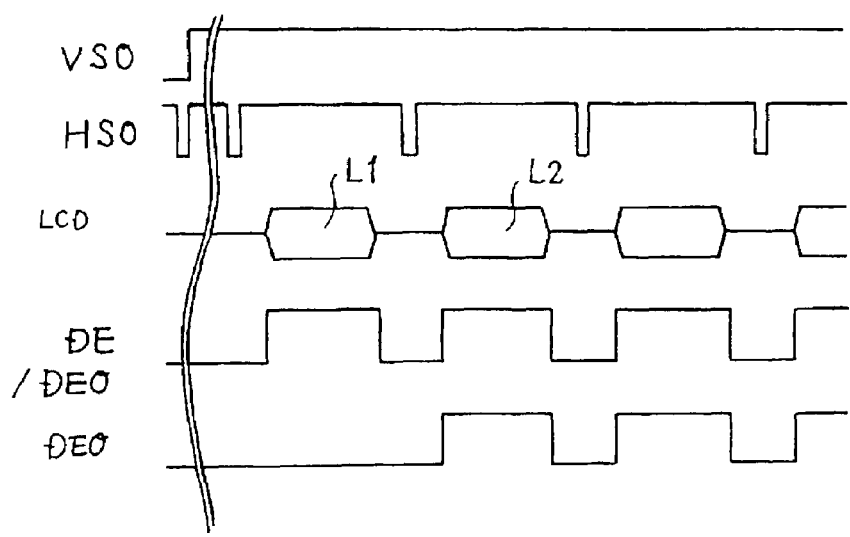
FIG. 13 is a time chart showing the operation of the display position correction circuit of FIG. 6.

The operation of this circuit will be described with reference to FIG. 13.

The data enable signal DE is activated when an input video signal fed to the LCD panel becomes effective. The start position of the video signal within a field occurs a predetermined time after the rise of a back porch of the vertical sync signal VSO.

If a field determination signal FD informs that the involved field is an odd-numbered field, the selection circuit 62 selects a non-shift input and brings it to the output. Hence, the incoming data enable signal DE is delivered as it is to serve as a data enable signal DEO for the display panel.

In contrast, if the field determination signal FD informs that the involved field is an even-numbered field, the selection circuit 62 selects a shifted output signal from the shift circuit 61 and brings it to the output. The shift circuit 61 shifts the data enable signal DE by one horizontal scanning period in the panel, so as to device a data enable signal DEO as shown in the lowest row of FIG. 13.

Since the display panel uses such a shifted data enable signal DEO, the video signal L1 carried by the first line will be discarded because the signal L1 does not accompany the data enable signal DEO. Therefore, scanning is not made for the video signal L1. On the panel side, a video signal L2 of the next scanning line comes to correspond to the display-start point of the display screen when the data enable signal DEO is active for the first time after starting of the field. In this way, the above-mentioned scanning line shifting is achieved.

In this embodiment, the shift circuit 61 performs shifting by one line. However, the shift amount may be determined as appropriate using the above equation.

In the above embodiment, the scan converter 3 executes horizontal interpolation. However, it is basically unnecessary to do horizontal interpolation if the A/D converter 2 samples input video signals (RGB signals) so that it obtains the appropriate number of dots or samples per line, required for the display device. However, the display device often has only a digital input port. In this case, introduction of the horizontal interpolation technique as described above will be helpful, because an input digital video signal fed to the port does not have always the number of samples per line appropriate to the display device. The LCD device as shown in FIG. 6 may have a capability of receiving a digital video signal from an external source through an auxiliary terminal as shown by a dashed line, in addition to a television signal such as a composite video signal based on NTSC or PAL standard. In such a case, switching means may be introduced for switching between a signal path from the A/D converter 2 or the signal path from the auxiliary terminal. Further, there may be provided means for entering or setting a horizontal expansion ratio of the external input digital video signal to a horizontal image size on the display device. Then, it is possible to make the horizontal interpolation as described above at the set expansion ratio. With respect to the vertical interpolation ratio, almost the same means may be introduced.

The above embodiments have been explained using the term "interpolation". This interpolation, however, includes interpolation at an expansion ratio (or interpolation ratio) of 1. Thus, the interpolation in this Application should be interpreted as "interpolation with an expansion ratio of 1 or more".

Furthermore, few types of input video signals have been mentioned as examples, but of course the present invention is not limited only to such video signals.

In the embodiments, the LCD panel is used as a display device, but of course the invention is not limited by this. The other types of display devices can be applied for the invention.

In the embodiments, an FIFO memory having a dual port is used. However, it is possible to use a memory different from a FIFO type, and to make a memory configuration to achieve the same function.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An interpolation method for a video signal, in which at least two line-memories are used, the line-memories being applied with an input digital video signal, and in which the line-memories are subjected to controls on their writing and reading so that a video signal subjected to vertical interpolation is generated from reading outputs of the line-memories, wherein for the controls on writing and reading, any of the line-memories are circularly selected and a sample sequence of the input digital video signal is sequentially written into the selected line-memory at a sample rate of the sample sequence, and at the same time the samples of the written sequence are sequentially read out at a substantially constant rate which is in accordance with a desired vertical expansion ratio and which is higher than the sample rate, wherein, when one of the line-memories is in a writing operation, the other one of the line-memories is subjected to a repeatedly reading control; and wherein the constant rate corresponds to a dot-frequency of image to be displayed.

2. A method according to claim 1, wherein a line-memory to be in a reading mode is designated based on a synchronization signal having a frequency more than by a factor of the vertical expansion ratio as high as a horizontal synchronization frequency of the input digital video signal.

3. A method according to claim 1, wherein the line-memories are FIFO type memories having a dual port.

4. An interpolation method for a video signal, in which at least two line-memories are used, the line-memories being applied with an input digital video signal, and in which the line-memories are subjected to controls on their writing and reading so that a video signal subjected to vertical interpolation is generated from reading outputs of the line-memories, wherein for the controls on writing and reading, any of the line-memories are circularly selected and a sample sequence of the input digital video signal is sequentially written into the selected line-memory at a sample rate of the sample sequence, and at the same time the samples of the written sequence are sequentially read out at a substantially constant rate which is in accordance with a desired vertical expansion ratio and which is higher than the sample rate, wherein, when one of the line-memories is in a writing operation, the other one of the line-memories is subjected to a repeatedly reading control; and wherein a line-memory to be in a reading mode is designated based on a synchronization signal having a frequency more than by a factor of the vertical expansion ratio as high as a horizontal synchronization frequency of the input digital video signal.

5. A method according to claim 4, wherein the line-memories are FIFO type memories having a dual port.

6. An interpolation method for a video signal, in which at least one line-memory is used, the line-memory being applied with an input digital video signal, and in which the line-memory is subjected to controlling including writing and reading thereof so that a video signal subjected to horizontal interpolation is generated from a reading-output of the line-memory, wherein the signal subjected to horizontal interpolation is applied to a serial input of a shift-register for applying pixel information signals associated respectively with column electrodes each extending in a vertical direction of a display area in displaying means, a shift-clock signal is applied to the shift-register, the shift-clock signal having a predetermined frequency for shifting data latched in the shift-register, for the controlling:

a sequence of samples of the input digital video signal is written into the line-memory while the samples of the written sequence are sequentially read out in response to a read-clock signal; and a frequency of the read-clock signal is set, to have a constant frequency which is lower than the frequency of the shift-clock signal and which is in accordance with a desired horizontal expansion ratio.

7. A method according to claim 6, wherein the read-clock signal is generated based on the shift-clock signal.

8. A method according to claim 7, wherein within one horizontal scanning period, one line of samples stored in the line-memory are read out at uniform intervals.

9. A method according to claim 6, wherein, within one horizontal scanning period, one line of samples stored in the line-memory are read out at uniform intervals.

10. A display device with a function of interpolating for a video signal, comprising at least one line-memory being applied with an input digital video signal, wherein the line-memory is subjected to controlling including writing and reading thereof so that a video signal subjected to horizontal interpolation is generated from reading-outputs of the line-memories, which further comprises:

means for applying the signal subjected to horizontal interpolation to a serial input of a shift-register for applying pixel information signals associated respectively with column electrodes each extending in a vertical direction of a display area in displaying means;

means for applying a shift-clock signal to the shift-register, the shift-clock signal having a predetermined frequency for shifting data latched in the shift-register; and means for performing writing a sequence of samples of the input digital video signal into the line-memory while sequentially reading out the samples of the written sequence in response to a read-clock signal, a frequency of the read-clock signal being set to have a constant frequency which is lower than the frequency of the shift-clock signal and which is in accordance with a desired horizontal expansion ratio.

11. The display device of claim 10, wherein the line-memory is a dual-port device.

* * * * *